US008457816B2

(12) United States Patent
Sprakel

(10) Patent No.: US 8,457,816 B2
(45) Date of Patent: Jun. 4, 2013

(54) FIRE DETECTION IN RAILWAY VEHICLES

(75) Inventor: Dirk Sprakel, Köln (DE)

(73) Assignee: FOGTEC Brandschutz GmbH & Co. KG, Köln (DE)

( * ) Notice: Subject to any disclaimer, the term of this patent is extended or adjusted under 35 U.S.C. 154(b) by 225 days.

(21) Appl. No.: 12/995,300

(22) PCT Filed: Apr. 21, 2009

(86) PCT No.: PCT/EP2009/054687
§ 371 (c)(1), (2), (4) Date: Jan. 13, 2011

(87) PCT Pub. No.: WO2009/149978
PCT Pub. Date: Dec. 17, 2009

(65) Prior Publication Data

US 2011/0106346 A1 May 5, 2011

(30) Foreign Application Priority Data

Jun. 13, 2008 (DE) ......................... 10 2008 028 134

(51) Int. Cl.
*G06F 17/00* (2006.01)

(52) U.S. Cl.
USPC ........................... 701/19; 340/425.5; 340/438

(58) Field of Classification Search
USPC ................... 701/19; 340/425.5, 438; 348/148
See application file for complete search history.

(56) References Cited

U.S. PATENT DOCUMENTS

| | | | | |
|---|---|---|---|---|
| 7,324,004 | B2 * | 1/2008 | Van Winkle et al. | 340/630 |
| 7,375,642 | B2 * | 5/2008 | Siemens et al. | 340/628 |
| 2005/0093707 | A1 | 5/2005 | Van Winkle et al. | 340/630 |
| 2009/0040367 | A1 * | 2/2009 | Zakrzewski et al. | 348/370 |

FOREIGN PATENT DOCUMENTS

| | | |
|---|---|---|
| EP | 1 419 804 | 5/2004 |
| EP | 1811478 | 7/2007 |
| JP | 2004/008566 | 1/2004 |

OTHER PUBLICATIONS

European Patent Office, European Search Report, Application No. 12153748.4, dated Apr. 2, 2012, 6 pages.
Cohausz & Florack, English Translation—European Search Report, Application No. 12153748.4, dated Apr. 2, 2012, 3 pages.
German Patent Office, Office Action, Application No. 097615641.3-2415, dated Jul. 8, 2011, 6 pages.
Cohausz & Florack, English Translation—Office Action, Application No. 097615641.3-2415, dated Jul. 8, 2011, 4 pages.
European Patent Office, International Search Report and The Written Opinion of the International Searching Authority—Appl. No. PCT/EP2009/054687, dated Aug. 6, 2009 (10 pages).
European Patent Office, English Translation of the International Search Report—Appl. No. PCT/EP2009/054687, dated Aug. 6, 2009 (3 pages).
Cohausz & Florack, English Translation—European Search Report, Application No. 12153748.4, dated Apr. 2, 2012, 4 pages.

* cited by examiner

*Primary Examiner* — Thomas Tarcza
*Assistant Examiner* — Tyler J Lee
(74) *Attorney, Agent, or Firm* — Sunstein Kann Murphy & Timbers LLP

(57) ABSTRACT

Method for detecting fires in railway vehicles. For detecting fires reliably and with a reduced error rate, it is proposed that compartment air in a railway vehicle be sucked in by means of at least two suctioning devices operated separately from one another, each in a monitoring region, that the monitoring parameter of the compartment air sucked in be evaluated in the suctioning devices and that a first control signal be output on detection of a monitoring parameter threshold value in at least one suctioning device.

11 Claims, 1 Drawing Sheet

FIRE DETECTION IN RAILWAY VEHICLES

TECHNICAL FIELD

The subject-matter relates to a method and also to a device for fire detection in railway vehicles. In particular in passenger railway carriages, fire detection that is as failsafe as possible should be made available.

BACKGROUND ART

In railway vehicles, low-error smoke gas detection is of utmost interest. In particular, the fire load introduced by the passengers cannot be controlled, which is why fires that break out can spread quickly and counter-measures must be taken very quickly. For example, a fire-fighting system must be able to tackle very quickly a fire that has broken out. If the fire spreads and the fire-fighting system fails, serious damage must be anticipated in most cases, which is why must it is imperative that smoke gas detection be designed with redundancy.

In known railway vehicles, smoke alarms are arranged electrically connected to one another in the railway carriages. If a smoke alarm goes off, an alarm signal is produced, whereupon a fire-fighting system is activated. Such a fire-fighting system may, for example, be a high pressure water mist system. For example, a fire-fighting system for railway vehicles is known from the German published patent application DE 10 2007 004 051.

In the known monitoring systems, however, on the failure of a fire alarm, monitoring of the monitoring region assigned to the fire alarm is no longer provided.

At best, a signal that the fire alarm no longer works may be output. If a fire breaks out at that moment, it cannot be detected quickly enough using conventional systems.

For this reason, the subject-matter was based on the object of establishing fire detection which enables monitoring with redundancy.

SUMMARY OF THE INVENTION

This object is achieved according to a subject-matter by a method for fire detection in railway vehicles, in which compartment air in a railway vehicle is sucked in by means of at least two suctioning devices operated separately from one another, each in a monitoring region. The compartment air sucked in is evaluated separately in the suctioning devices. On detection of a monitoring parameter threshold value in at least one suctioning device, a first control signal is output. A monitoring parameter may be the smoke gas content, the CO2 content or the number of smoke gas particles, for example.

The sucking-in of compartment air by means of two suctioning devices operated separately from one another, each in a monitoring region, ensures that on the failure of a suctioning device in a monitoring region, the second suctioning device in each case remains available for fire detection. The separate evaluation ensures that in the event of an incorrect evaluation of a monitoring parameter by a suctioning device, a means of correction exists which is created by the second suctioning device.

If a threshold value of a monitoring parameter is exceeded, a control signal is output which introduces the necessary measures, for example activation of fire-fighting measures, stopping of the train, introduction of evacuation measures or switching on of surveillance cameras.

According to an advantageous exemplary embodiment, it is proposed that the compartment air be sucked in along the monitoring region by means of suction pipes having a plurality of suctioning openings distributed along their axis. By arranging the suction pipes along the monitoring region, for example along the axis of the railway vehicle, a large monitoring region can be covered by means of a single suction pipe. Suction pipes with an opening for sucking in compartment air may be used in the objective method. A fire can be localised by the suction pipes. By placing two suctioning devices in the same detection region, or that is to say, two suction pipes, system reliability can be increased. If a suctioning device fails, then the respective other suctioning device with the suction pipe is available in any event and can output a control signal if a monitoring parameter threshold value has been exceeded. A control signal may, for example, be a pre-alarm, through which preparatory measures can be introduced. As a result of this, a monitoring system free of false alarms is provided.

According to an advantageous exemplary embodiment, it is proposed that an alarm signal be output on detection of a monitoring parameter threshold value in at least two suctioning devices assigned to the same monitoring region. In this exemplary embodiment, simultaneous detection of a monitoring parameter threshold value in two suctioning devices of a monitoring region may be necessary to output the alarm signal. As a result, it can be concluded with certainty that a fire has broken out. This measure enables monitoring that is free of false alarms, since it is only on detection of smoke gases, an increased CO2 concentration or an increased number of smoke particles in two independent suctioning devices that an alarm signal is triggered. Triggering due to a false alarm becomes less likely, as the alarm signal is only produced when both suctioning devices detect the monitoring parameter threshold value, that is to say, both give a first control signal. The alarm signal may, for example, trigger activation of fire-fighting measures, stopping of the train, introduction of evacuation measures or switching on of surveillance cameras. Incorrect triggering is less likely, however, as the alarm signal is only produced when both suctioning devices detect the monitoring parameter threshold value.

Monitoring in two regions of the railway vehicle spatially separated from one another is possible according to an advantageous exemplary embodiment. In this connection, for example, two suction pipes can branch off from a first suctioning device, each one into one of the two regions spatially separated from one another, and likewise two suction pipes can branch off from the second suctioning device, each one into one of the two regions spatially separated from one another. In this way, each suctioning device has one suction pipe branching into one region in each case.

If a suctioning device fails, then the second suctioning device continues to monitor both regions, which leads to a redundancy.

The objective method can be particularly well implemented in double-deck railway vehicles, in which upper level and lower level must be monitored.

As explained above, in each case one suctioning device can evaluate the monitoring parameter from the at least two regions spatially separated from one another, according to an advantageous exemplary embodiment. In this way, it is ensured that on the failure of a suctioning device, the respective other suctioning device continues to monitor the monitored region, and a fire can be detected.

To enable increased security against false alarms, it is proposed that on the failure of a suctioning device, a second control signal (failure signal) is output. Outputting a failure signal need not necessarily induce an alarm signal, but may induce other actions which equate to increased vigilance.

Thus, it is possible, for example according to an advantageous exemplary embodiment, that on the output of the first control signal, an instruction for video surveillance of the monitoring region assigned to the suctioning device inducing the control signal is issued. If the first control signal is received, a fire is still not necessarily detected. Video surveillance that is activated by the train driver, for example, may cover the region to be monitored, so that the train driver can visually inspect whether there is actually a fire or not. Video surveillance may, for example, also be activated on receipt of the failure signal, as in this case no monitoring with redundancy is possible any more, as a suctioning device has failed.

In particular when a suctioning device has failed, and thus the failure signal has been output, fire detection with redundancy is no longer possible. In this case, on the presence of the failure signal, the output of the first control signal must activate an alarm signal according to an advantageous exemplary embodiment.

To avoid the suctioning device consuming energy unnecessarily, it is proposed that the operation of the suctioning device be coupled to the operation of the railway vehicle. This can take place, for example, such that the suctioning device is switched off a preset amount of time, for example half an hour, after operation of the railway vehicle has ended and is only switched on again after operation has resumed.

According to a further aspect, a railway vehicle fire detection device is proposed, which comprises at least two suctioning devices operated separately from one another, each assigned to a monitoring region and configured to suck in compartment air, wherein the suctioning devices are formed such that they evaluate the compartment air sucked in separately from one another, and a first control signal is output on detection of a threshold value of a monitoring parameter in at least one suctioning device. A monitoring parameter may be the smoke gas content, the $CO_2$ content or the number of smoke gas particles, for example.

According to an advantageous exemplary embodiment, it is proposed that suction pipes arranged along the longitudinal axis of the railway vehicle and having openings be provided. As already described above, suction pipes arranged along the longitudinal axis of the railway vehicle are particularly suitable for detecting the monitoring parameters, as these have a large detection area and can thus monitor elongate objects well.

To be able to monitor a plurality of regions, it is proposed that the at least two suctioning devices be arranged spatially separated from one another.

To prevent a defect in a part of the vehicle or damage to a part of the vehicle from destroying both suctioning devices simultaneously, it is proposed that a suctioning device be arranged in a front part of the vehicle and a second suctioning device be arranged in a rear part of the vehicle.

It is also proposed that the suction pipes be arranged in regions spatially separated from one another.

BRIEF DESCRIPTION OF THE DRAWINGS

The subject-matter will be explained in further detail hereinafter, with reference to a drawing showing exemplary embodiments. In the drawing.

DETAILED DESCRIPTION OF SPECIFIC EMBODIMENTS

Figure 1:
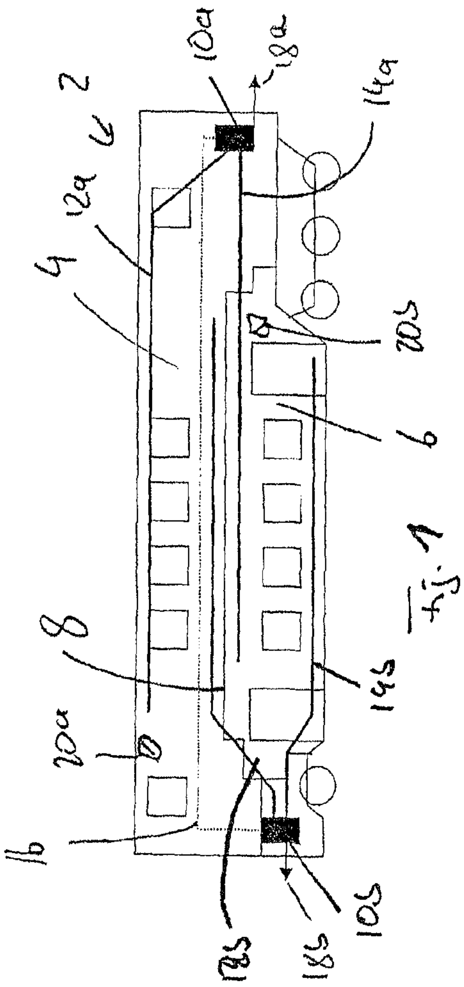
FIG. 1 shows a railway vehicle indicated schematically.

FIG. 1 shows a railway vehicle 2 having an upper level 4 and a lower level 6, divided by a partition ceiling 8. Further, a first suctioning device 10*a* and a second suctioning device 10*b* are provided in the railway vehicle 2. Suction pipes 12*a* and 14*a* are arranged on the first suctioning device 10*a*. Suction pipes 12*b* and 14*b* are attached to the second suctioning device 10*b*. As can be seen, the suction pipes 12*a* and 12*b* run in the upper level 4 of the railway vehicle 2. In the schematic representation, the suction pipe 12*a* runs in the upper region of the upper level 4 and the suction pipe 12*b* runs in the lower region of the upper level 4. The suction pipes 12*a*, 12*b* may also both be arranged spatially separated from one another in the ceiling or the floor of the railway vehicle 2.

Further, it can be seen that the suction pipes 14*a*, 14*b* are arranged in the lower level 6 of the railway vehicle 2.

The suctioning devices 10*a*, 10*b* suck in the compartment air via the suction pipes 12, 14 in the upper level 4 and in the lower level 6 respectively and monitor the compartment air sucked in, for example the smoke gas content or other quality parameters, such as for example the $CO_2$ content or the number of smoke particles. The linear extent of the suction pipes 12, 14 in the upper level 4 and the lower level 6 means that the whole region is monitored. The suctioning devices 10 are monitored by monitoring devices (not shown), and failure of the suctioning devices 10 themselves is detected.

The suctioning devices 10 are connected to one another by means of a data line 16 and communicate with one another. The suctioning devices 10 can output control signals and alarm signals by means of outputs 18.

In the event that a suctioning device is damaged, an output signal is also produced by means of one of the outputs 18, which output signal indicates damage to the suctioning device.

If one of the suctioning devices 10 detects an increased smoke gas content or an increased $CO_2$ content or an increased number of smoke particles in the compartment air sucked in, then this suctioning device 10 outputs a first control signal. The signals at the outputs 18 are evaluated in an evaluation computer (not shown). If a first control signal is present, then for example a video surveillance 20*a*, 20*b* is activated in the region which belongs to the suction pipe in which an increased smoke gas concentration was detected, which induced the first control signal.

If, in addition to the first control signal, an increased smoke gas concentration is also detected in the corresponding region in a second suctioning device 10, a further control signal is output. On the presence of two control signals, which simultaneously signal smoke gas detection in one and the same region, for example a fire-fighting measure, for example by means of sprinklers, extinguishing mist or foam, is activated by the central control computer. It is also possible that further video surveillances are activated, the train is stopped and/or an evacuation measure is introduced.

It can be seen that the suctioning devices 10*a*, 10*b* are arranged at opposite ends of the railway vehicle 2. Further, it can be seen that each one of the suctioning devices 10 operates one suction pipe 12, 14 in one of the regions 4, 6. An increased redundancy is ensured through the arrangement represented of the suctioning device 10 and the suction pipes 12, 14.

Operation of the suctioning devices 10 may be coupled to the operation of the railway vehicle 2. In this connection, it is possible that the suctioning devices 10 suck in the compartment air only during the periods of operation of the railway vehicle 2, and are deactivated outside its periods of operation. A follow-up time of, for example, half an hour or an hour, may also be configured, so that the compartment air can also be sucked in and evaluated half an hour or an hour after switching off the railway vehicle 2.

Figure 2:
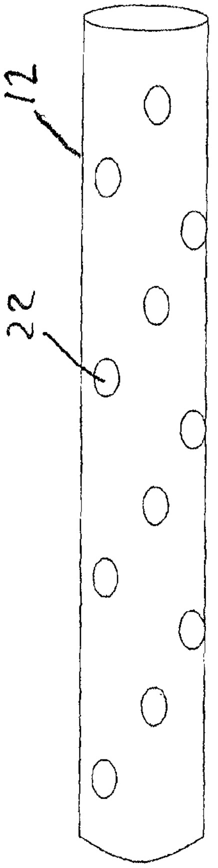
FIG. 2 shows a suction pipe.

FIG. 2 shows a suction pipe 12 by way of example. It can be seen that the suction pipe 12 has holes 22. The holes 22 are arranged along the axis of the suction pipe 12 and serve to suck in the compartment air. The compartment air is sucked in by means of the holes 22 along the entire axis of the suction pipe 12. It is also possible to arrange the holes along a line on the pipe casing. It is also possible to arrange the holes at intervals of 30-50 cm.

The compartment air sucked in is transported through the suction pipe 12 to the suctioning device 10. There, the compartment air sucked in is evaluated. A control signal may be output as a function of the evaluation result.

The mean time between failure (MTBF) is increased by means of the objective method and the intelligent linkage of the output signals of the suctioning devices 10.

Often, the certification of a train demands full functionality of a fire-detection system so that the train may actually go into operation. If only one detection system were installed, then the train would not be able to leave the depot if this system were defective. However, the objective construction with redundancy ensures that an alarm sounds even if a suctioning device were to fail. The train would therefore only have to remain in the depot if both suctioning devices were defective.

The number of false alarms is also reduced and the length of time between two false alarms is increased. By activating video surveillance on recognition of a first control signal or even simply by informing the train driver to activate the video surveillance, increased safety is ensured. With the aid of the objective method, fires can be detected more reliably and can thus be fought more effectively.

What is claimed is:

1. A method for detecting fires in railway vehicles, comprising:

sucking-in of compartment air in a railway vehicle by at least two suctioning devices operated separately from one another, wherein a first one of the suctioning devices includes a first suction pipe branching into a first region and a second suction pipe branching into a second region, the first and second regions being within spatially separated monitoring regions of the railway vehicle and wherein a second one of the suctioning devices includes a third suction pipe branching into the first region and a fourth suction pipe branching into the second region;

separately evaluating monitoring parameters of the compartment air sucked-in in the at least two suctioning devices; and outputting an alarm signal on simultaneous detection of a monitoring parameter in two of the at least two suctioning devices for localizing a fire.

2. The method of claim 1, wherein the compartment air is sucked-in through a plurality of suction openings distributed along an axis of each of the first, second, third, and fourth suction pipes.

3. The method of claim 1, wherein an alarm signal is only output on detection of a monitoring parameter threshold value in at least two suctioning devices assigned to the same monitoring region.

4. The method of claim 1, wherein the first region is an upper level of the railway vehicle and the second region is a lower level of the railway vehicle.

5. The method of claim 1, wherein each suctioning device evaluates the monitoring parameters from at least two regions spatially separated from one another.

6. The method of claim 1, wherein a control signal is output when a suctioning device fails.

7. The method of claim 1, further comprising outputting a control signal on detection of a threshold value of the monitoring parameters in at least one of the suctioning devices and wherein in response to the control signal, an instruction for video surveillance of the monitoring region assigned to the suctioning device causing the control signal is issued.

8. The method of claim 1 wherein each suctioning device operates only when the railway vehicle operates.

9. A railway vehicle fire detection device comprising:

at least two suctioning devices operated separately from one another, each of the at least two suctioning devices configured to suck in compartment air, a first one of the suctioning devices including a first suction pipe branching into a first region and a second suction pipe branching into a second region, the first and second regions being within spatially separated monitoring regions, and a second one of the suctioning devices including a third suction pipe branching into the first region and a fourth suction pipe branching into the second region, wherein the compartment air sucked into each of the at least two suctioning devices is evaluated separately and an alarm signal is output on simultaneous detection of a monitoring parameter in two of the at least two suctioning devices for localizing a fire.

10. The railway vehicle fire detection device of claim 9, wherein each of the first, second, third and fourth suction pipes includes openings and each of the pipes is arranged along the longitudinal axis of the railway vehicle.

11. The railway vehicle fire detection device of claim 9, wherein the first suctioning device is arranged in a front part of the railway vehicle and the second suctioning device is arranged in a rear part of the railway vehicle.

* * * * *